(12) United States Patent
Ikeya et al.

(10) Patent No.: US 8,714,136 B2
(45) Date of Patent: *May 6, 2014

(54) DIRECT FUEL-INJECTION ENGINE

(75) Inventors: Kenichiro Ikeya, Wako (JP); Nobuhiko Sasaki, Wako (JP); Hiroshi Sono, Wako (JP); Yukihisa Yamaya, Wako (JP); Akihiro Yamaguchi, Wako (JP); Yoshimasa Kaneko, Wako (JP); Goichi Katayama, Wako (JP); Yutaka Tajima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 741 days.

This patent is subject to a terminal disclaimer.

(21) Appl. No.: 12/745,814

(22) PCT Filed: Dec. 12, 2008

(86) PCT No.: PCT/JP2008/072654
§ 371 (c)(1),
(2), (4) Date: Jun. 2, 2010

(87) PCT Pub. No.: WO2009/081765
PCT Pub. Date: Jul. 2, 2009

(65) Prior Publication Data
US 2010/0258078 A1 Oct. 14, 2010

(30) Foreign Application Priority Data
Dec. 21, 2007 (JP) .................. 2007-330367

(51) Int. Cl.
*F02B 3/00* (2006.01)
(52) U.S. Cl.
USPC .................. 123/298; 123/193.6

(58) Field of Classification Search
USPC .................. 123/276–279, 298, 193.6
See application file for complete search history.

(56) References Cited

U.S. PATENT DOCUMENTS

| 4,344,408 A * | 8/1982 | Inoue et al. | 123/661 |
| 4,676,208 A * | 6/1987 | Moser et al. | 123/276 |
| 2009/0314253 A1 * | 12/2009 | Sono et al. | 123/298 |
| 2010/0147260 A1 * | 6/2010 | Yamaguchi et al. | 123/276 |

FOREIGN PATENT DOCUMENTS

| EP | 2 034 157 A1 | 3/2009 |
| EP | 2 039 905 A1 | 3/2009 |
| JP | 62-255520 A | 11/1987 |

(Continued)

*Primary Examiner* — John Kwon
(74) *Attorney, Agent, or Firm* — Arent Fox LLP

(57) ABSTRACT

In a direct fuel-injection engine equipped with a pentroof-shaped piston, cross-sectional shapes containing a piston central axis (Lp) of a cavity recessed in a central part of the piston having a top face with the height varying in the circumferential direction are set so as to be basically identical at each position in the circumferential direction (see broken line). Since the sizes of the cross-sectional shapes of the cavity thereby become different in a region further on the piston central axis (Lp) side than intersection points (e1, d1) in the vicinity of a fuel injection point (Oinj), in order to compensate for this, by correcting in a cross section that is away from the piston pin direction the cross-sectional shape of the broken line into the cross-sectional shape of a solid line so that it enlarges, the size of the cross-sectional shape at each position of the circumferential direction of the cavity is thereby made more uniform, thus making the conditions in which fuel and air are mixed uniform and improving the engine output and reducing harmful exhaust materials.

7 Claims, 11 Drawing Sheets

(56) References Cited

FOREIGN PATENT DOCUMENTS

| | | |
|---|---|---|
| JP | 62-255524 A | 11/1987 |
| JP | 62-288311 A | 12/1987 |
| JP | 63-16124 A | 1/1988 |
| JP | 5-17369 B2 | 3/1993 |
| JP | 6-23540 B2 | 3/1994 |
| JP | 8-319833 A | 12/1996 |
| JP | 2000-145461 A | 5/2000 |
| JP | 2002-122024 A | 4/2002 |
| JP | 2002-276374 A | 9/2002 |
| JP | 2002-349267 A | 12/2002 |
| JP | 2003-328759 A | 11/2003 |
| JP | 2004-270476 A | 9/2004 |
| JP | 2008-2443 A | 1/2008 |

\* cited by examiner

CROSS-SECTION IN DIRECTION INTERSECTING PISTON PIN AT 60°

CROSS-SECTION IN DIRECTION ALONG PISTON PIN

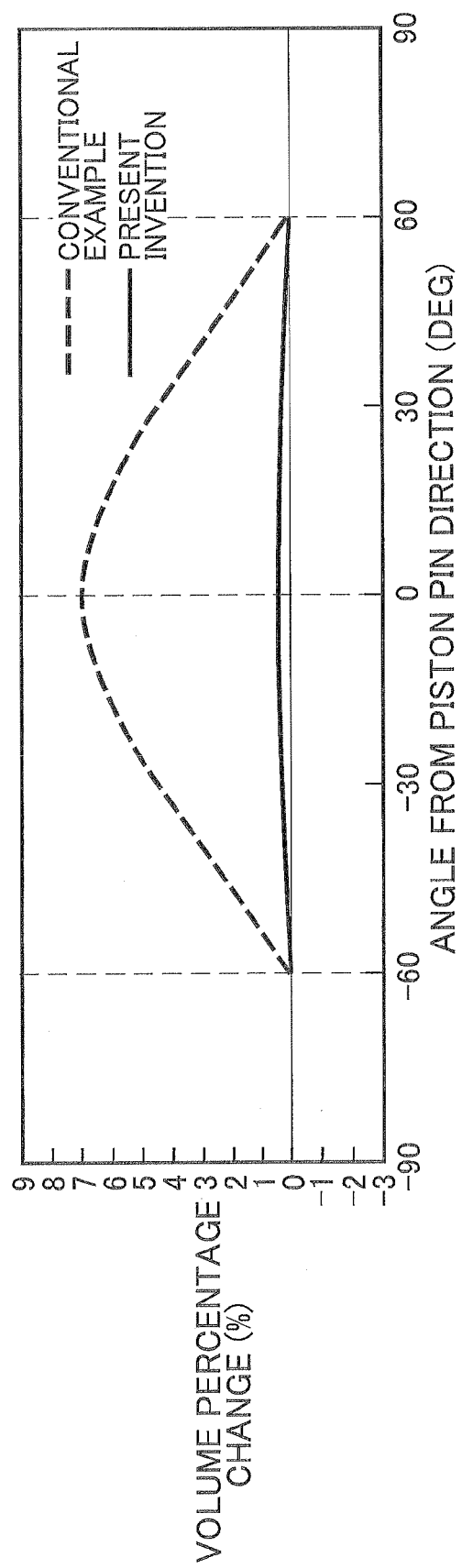

DIRECT FUEL-INJECTION ENGINE

CROSS-REFERENCE TO RELATED APPLICATION

This application is a National Stage entry of International Application No. PCT/JP20081072654, filed Dec. 12, 2008, which claims priority of Japanese Patent Application No. 2007-330367, filed Dec. 21, 2007. The disclosure of the prior application hereby incorporated in its entirety by reference.

TECHNICAL FIELD

The present invention relates to a direct fuel-injection engine that includes a piston having a top face with a height in a piston central axis direction that varies in the circumferential direction, a cavity recessed in a central part of the top face of the piston, and a fuel injector for injecting fuel into the interior of the cavity.

BACKGROUND ART

The top face of a piston of a direct fuel-injection diesel engine is generally formed as a flat face, but a direct fuel-injection diesel engine having a piston with a top face that projects in a pentroof shape is known from Patent Document 1 below.

When a cavity is recessed in the top face of a pentroof-shaped piston, the height of an opening of the cavity varies in the circumferential direction. Therefore, if the height of a bottom wall portion of the cavity is made uniform in the circumferential direction, the depth of a peripheral wall portion of the cavity varies in the circumferential direction, and the conditions in which air and fuel injected from a fuel injector are mixed become nonuniform in the circumferential direction, thus giving rise to the problems that the engine output decreases and harmful exhaust substances increase.

In order to solve such problems, in the arrangement described in Patent Document 1, the height of the bottom wall portion of the cavity is varied so as to follow the variation in height of the opening of the cavity, thus making the depth of the peripheral wall portion of the cavity substantially uniform in the circumferential direction and thereby making the conditions in which fuel and air are mixed in the cavity uniform in the circumferential direction.
Patent Document 1: Japanese Patent Publication No. 5-17369

DISCLOSURE OF INVENTION

Problems to be Solved by the Invention

In the above-mentioned conventional arrangement, although the depth of the peripheral wall portion of the cavity becomes uniform in the circumferential direction, since the cross-sectional shape of the cavity passing along each fuel injection axis varies according to the height of the opening of the cavity, it is not always possible to make the conditions in which fuel and air are mixed uniform in the circumferential direction of the cavity.

The present applicant has proposed in Japanese Patent Application No. 2006-175597 a direct fuel-injection engine in which, by forming each of the cross-sectional shapes of a cavity passing through a plurality of fuel injection axes of a fuel injector disposed on a piston central axis so as to be basically identical, the conditions in which air and fuel are mixed within the cavity are made uniform, thereby enabling the output of the engine to be improved and harmful exhaust materials to be reduced.

However, in the arrangement proposed by Japanese Patent Application No. 2006-175597 (hereinafter, called the invention of the prior application), each of the cross-sectional shapes of the cavity is made basically identical but, as described in detail later, due to the influence of the pentroof shape of the top face of the piston, a cavity cross-sectional shape that is parallel to the axis of a piston pin and a cavity cross-sectional shape that intersects the axis of the piston pin are different from each other, and there is therefore still room for further improving the uniformity of the conditions in which air and fuel are mixed within the cavity.

The present invention has been accomplished in the light of the above-mentioned circumstances, and it is an object thereof to provide a direct fuel-injection engine equipped with a pentroof-shaped piston in which air and fuel can be mixed as uniformly as possible in all circumferential directions of a cavity.

Means for Solving the Problems

In order to attain the above object, according to a first aspect of the present invention, there is provided a direct fuel-injection engine comprising a piston having a top face with a height in a piston central axis direction that varies in the circumferential direction, a cavity recessed in a central part of the top face of the piston, and a fuel injector for injecting fuel into the cavity, wherein the shape of an inner wall face of the cavity is set so that, with N as a natural number of 2 or more, when the cavity is divided into N virtual cavity sections by the inner wall face of the cavity and N half planes extending radially from the piston central axis and having equal included angles, the volumes of the virtual cavity sections are substantially equal.

According to a second aspect of the present invention, in addition to the first aspect, there is provided the direct fuel-injection engine, wherein the fuel injector comprises a plurality of fuel injection axes spaced in the circumferential direction, a cross-section of the cavity passing through an nth fuel injection axis is defined as a fuel injection cross-section $S_n$, an intersection point of the fuel injection cross-section $S_n$ with the opening peripheral edge of the cavity is defined as a first specific point $A_n$, a second specific point $B_n$ is present on a line that passes through the first specific point $A_n$ and is parallel to a lower face of a cylinder head in the fuel injection cross-section $S_n$, a third specific point $C_n$ is present on a bottom wall portion of the cavity in the fuel injection cross-section $S_n$, the second specific point $B_n$ is at a position closer to the piston central axis than the first specific point $A_n$, the third specific point $C_n$ is at a position closer to the piston central axis than a position of the maximum outer diameter of the bottom wall portion of the cavity, a cross-sectional shape surrounded by a path $A_nB_n$ connecting the first and second specific points $A_n$ and $B_n$ by a line along the lower face of the cylinder head in the fuel injection cross-section $S_n$, a path $A_nC_n$ connecting the first and third specific points $A_n$ and $C_n$ along a wall face of the cavity in the fuel injection cross-section $S_n$, and a path $B_nC_n$ connecting the second and third specific points $B_n$ and $C_n$ by the shortest straight line, the cross-sectional shape being substantially equal for each fuel injection cross-section $S_n$, is defined as a reference cross-sectional shape, and the volume of each virtual cavity section is made substantially equal by varying the shape of the inner wall face of the cavity so that the reference cross-sectional shape enlarges for the fuel injection cross-section $S_n$ passing through a fuel injection axis that is present in a direction where the height, in the piston central axis direction, of the top face of the piston is low.

According to a third aspect of the present invention, in addition to the second aspect, there is provided the direct fuel-injection engine, wherein, of the path AnCn, the shape of a section from the lowest part of the path AnCn to the third specific point Cn is varied so that it enlarges.

According to a fourth aspect of the present invention, in addition to the second or third aspect, there is provided the direct fuel-injection engine, wherein the number N of the virtual cavity sections is equal to the number of the fuel injection axes.

According to a fifth aspect of the present invention, in addition to the fourth aspect, there is provided the direct fuel-injection engine, wherein the bisector of the included angle coincides with the fuel injection axis when viewed in the piston central axis direction.

According to a sixth aspect of the present invention, in addition to any one of the first to fifth aspects, there is provided the direct fuel-injection engine, wherein the volume of the virtual cavity sections includes the volume of a portion sandwiched by the top face of the piston at top dead center and a lower face of a cylinder head.

According to a seventh aspect of the present invention, in addition to any one of the first to sixth aspects, there is provided the direct fuel-injection engine, wherein the shape of the top face of the piston is a pentroof shape having two inclined faces that are inclined with a ridgeline parallel to the axis of a piston pin interposed therebetween.

According to an eighth aspect of the present invention, there is provided a direct fuel-injection engine comprising a piston having a top face with a height in a piston central axis direction that varies in the circumferential direction, a cavity recessed in a central part of the top face of the piston, and a fuel injector for injecting fuel into the cavity, wherein the shape of an inner wall face of the cavity is set so that, with N as a natural number of 2 or more, when the cavity is divided into N virtual cavity sections by the inner wall face of the cavity and N half planes extending radially from the piston central axis and having equal included angles, variations in volume of the virtual cavity sections are smaller than variations in volume of the N virtual cavity sections when the depth of the cavity is made uniform in the circumferential direction.

Effects of the Invention

In accordance with the first aspect of the present invention, since the shape of the inner wall face of the cavity recessed in the central part of the piston top face is set so that, when the cavity is divided into N virtual cavity sections by the inner wall face of the cavity and N half planes extending radially from the piston central axis and having equal included angles, the volumes of the virtual cavity sections are substantially identical, it is possible to make the conditions in which air and fuel are mixed in the cavity uniform, thereby improving the engine output and reducing harmful exhaust materials.

Furthermore, in accordance with the second aspect of the present invention, with the cross-sectional shape of the cavity of the invention of the prior application as a reference cross-sectional shape, by varying the shape of the inner wall face of the cavity so that the reference cross-sectional shape enlarges for the fuel injection cross-section Sn passing through the fuel injection axis that is present in the direction where the height of the piston top face in the piston central axis direction is lower, the virtual cavity sections are made to have substantially equal volumes, and compared with the invention of the prior application the conditions in which air and fuel are mixed in the injection cross-sections Sn can therefore be made more uniform.

Moreover, in accordance with the third aspect of the present invention, although, of the path AnCn on the inner wall face of the cavity, the section from the lowest part of the path AnCn to the third specific point Cn is close to the fuel injection axis, by varying the shape of the section so that it enlarges it is possible to suppress the attachment of fuel to the inner wall face of the cavity, thus preventing degradation of combustion.

Furthermore, in accordance with the fourth aspect of the present invention, since the number N of virtual cavity sections is made equal to the number of fuel injection axes, one fuel injection axis corresponds to one cavity section, and the conditions in which fuel is mixed can be made uniform in the circumferential direction.

Moreover, in accordance with the fifth aspect of the present invention, since the bisector of the included angle of the cavity section coincides with the fuel injection axis when viewed in the piston axis direction, the fuel injection axis is positioned at the center of one cavity section, and the conditions in which fuel is mixed can be made yet more uniform in the circumferential direction.

Furthermore, in accordance with the seventh aspect of the present invention, since the shape of the top face of the piston is a pentroof shape having two inclined faces that are inclined with a ridgeline parallel to the axis of the piston pin interposed therebetween, the area of the opening of the intake port can be increased, thereby enhancing intake efficiency.

Moreover, in accordance with the eighth aspect of the present invention, since the shape of the inner wall face of the cavity is set so that variations in volume of the virtual cavity sections when the cavity is divided into N virtual cavity sections are smaller than variations in volume of the N virtual cavity sections when the depth of the cavity is made uniform in the circumferential direction (the invention of Patent Document 1), compared with the invention of Patent Document 1, the conditions in which air and fuel are mixed within the cavity are made more uniform, thus improving the engine output and reducing harmful exhaust materials.

BRIEF DESCRIPTION OF DRAWINGS

FIG. 11 is a graph showing percentage change in volume of the cavity section when the direction of the cavity section is varied in the circumferential direction (first embodiment).

EXPLANATION OF REFERENCE NUMERALS AND SYMBOLS

13 Piston
14 Piston pin
16 Cylinder head
23 Fuel injector
25 Cavity
25c Bottom wall portion
25A to 25F Cavity sections
Li1 Fuel injection axis
Li2 Fuel injection axis
Lp Piston central axis
Oinj Fuel injection point
X1 to X6 Half planes

BEST MODE FOR CARRYING OUT THE INVENTION

A mode for carrying out the present invention is explained below by reference to the attached drawings.

First Embodiment

FIG. 1 to FIG. 11 show a mode for carrying out the present invention.

Figure 1:
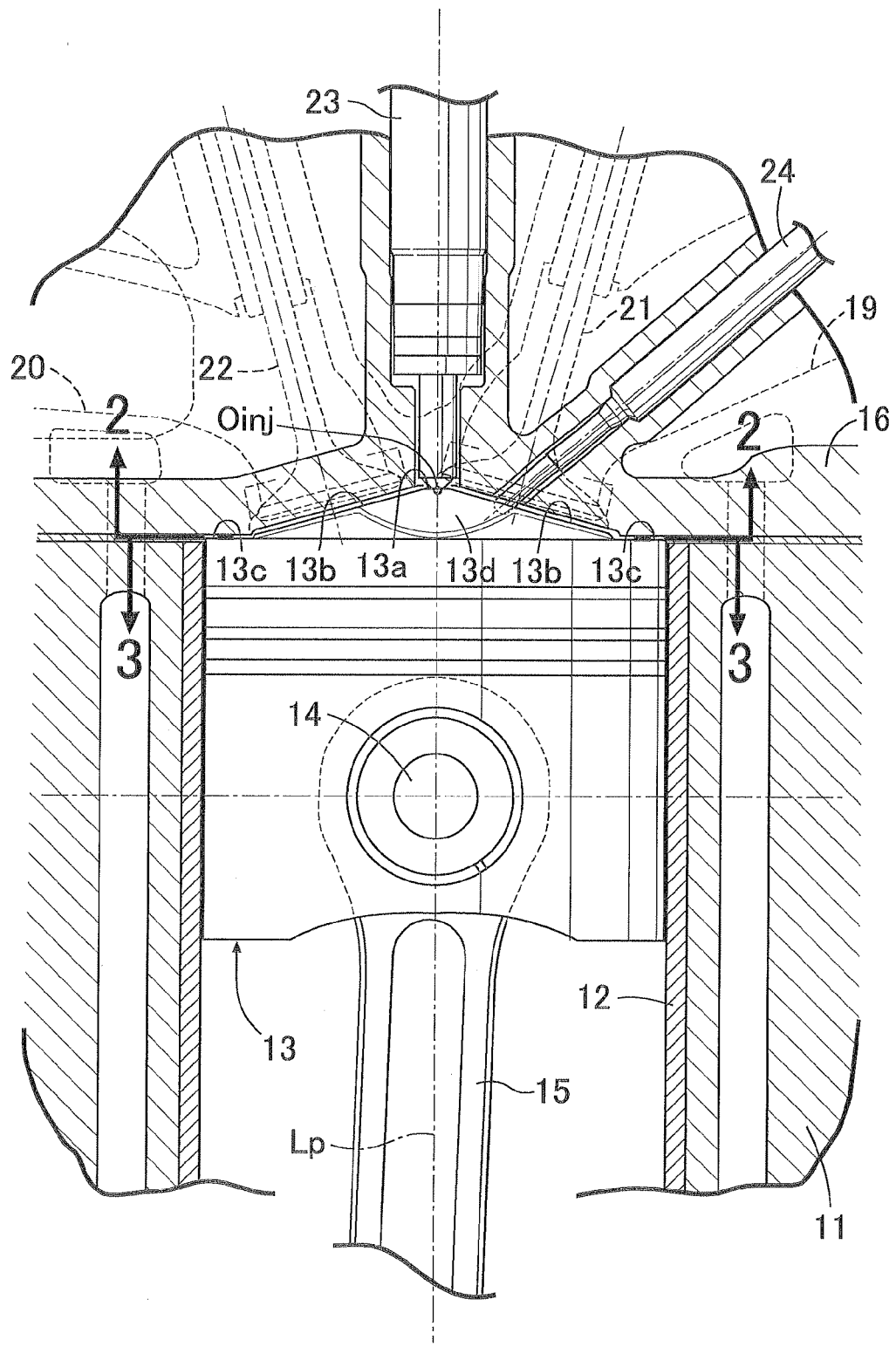
FIG. 1 is a longitudinal cross-sectional view of an essential part of a diesel engine (first embodiment).
Figure 2:
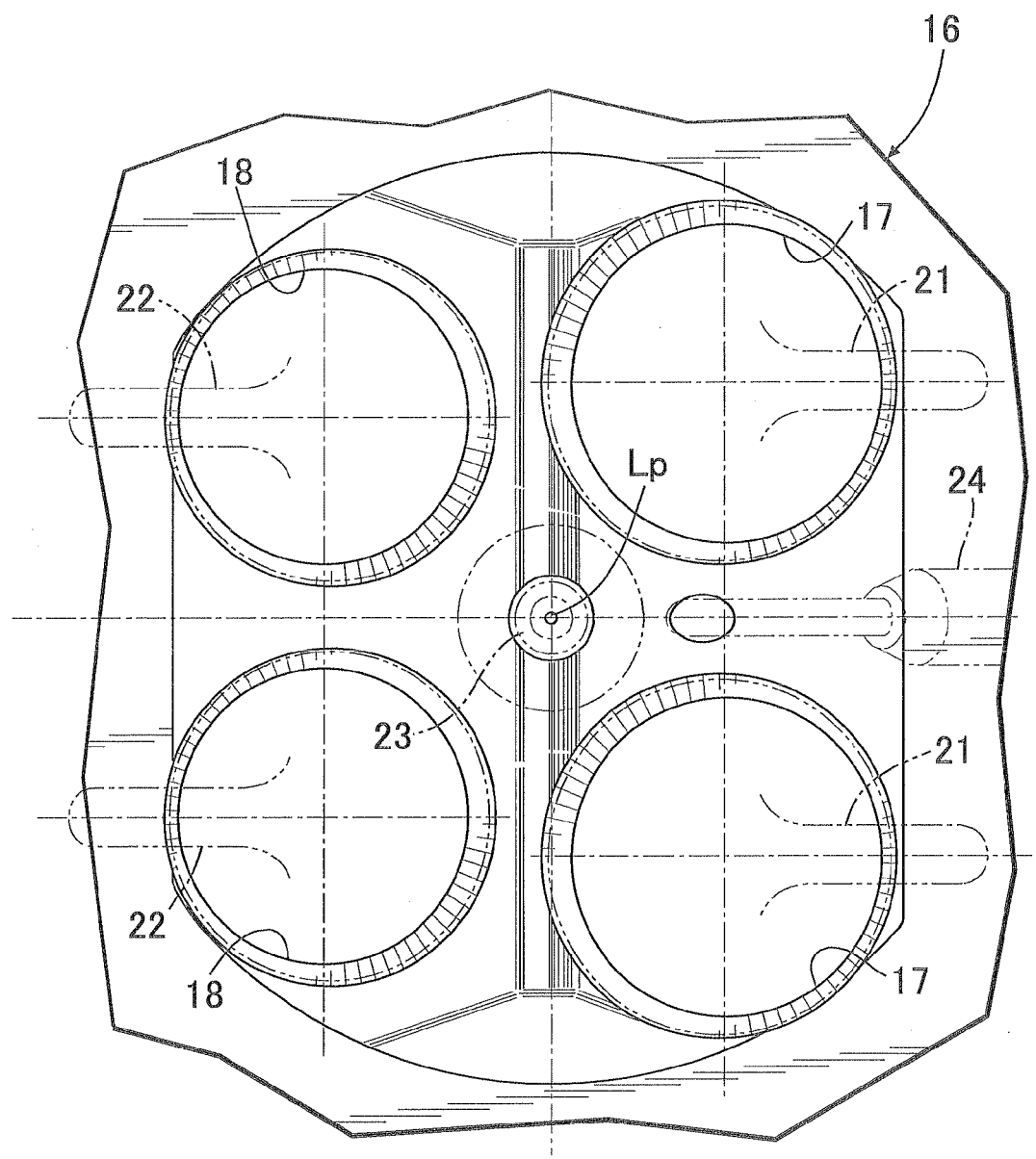
FIG. 2 is a view from arrowed line 2-2 in FIG. 1 (first embodiment).
Figure 3:
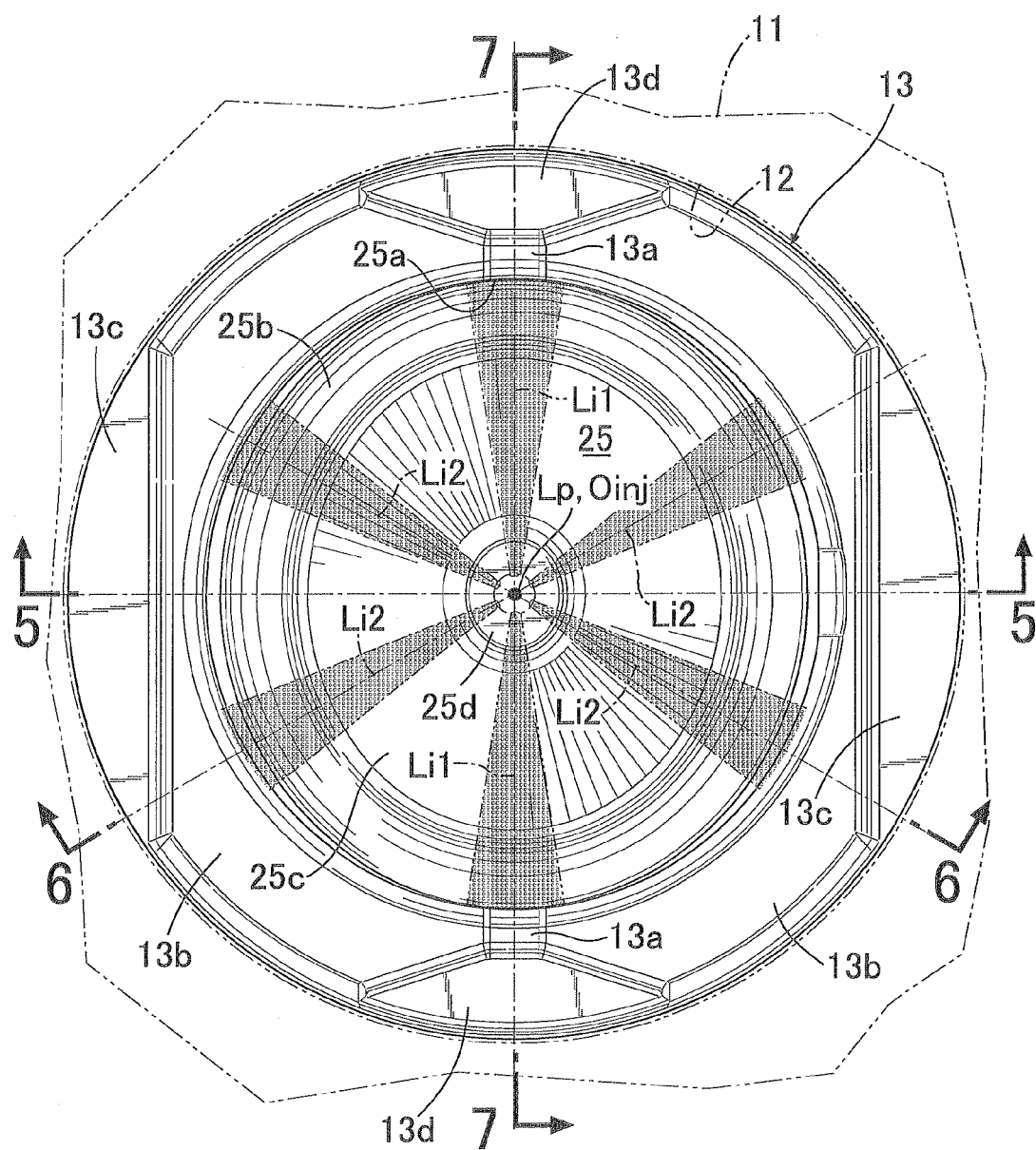
FIG. 3 is a view from arrowed line 3-3 in FIG. 1 (first embodiment).

As shown in FIG. 1 to FIG. 3, a direct fuel-injection type diesel engine includes a piston 13 slidably fitted into a cylinder 12 formed in a cylinder block 11, and the piston 13 is connected to a crankshaft (not illustrated) via a piston pin 14 and a connecting rod 15. Two intake valve holes 17 and 17 and two exhaust valve holes 18 and 18 facing a top face of the piston 13 open in a lower face of a cylinder head 16, which is joined to an upper face of the cylinder block 11. An intake port 19 communicates with the intake valve holes 17 and 17, and an exhaust port 20 communicates with the exhaust valve holes 18 and 18. The intake valve holes 17 and 17 are opened and closed by intake valves 21 and 21, and the exhaust valve holes 18 and 18 are opened and closed by exhaust valves 22 and 22. A fuel injector 23 is provided so as to be positioned on a piston central axis Lp, and a glow plug 24 is provided so as to be adjacent to the fuel injector 23.

Figure 4:
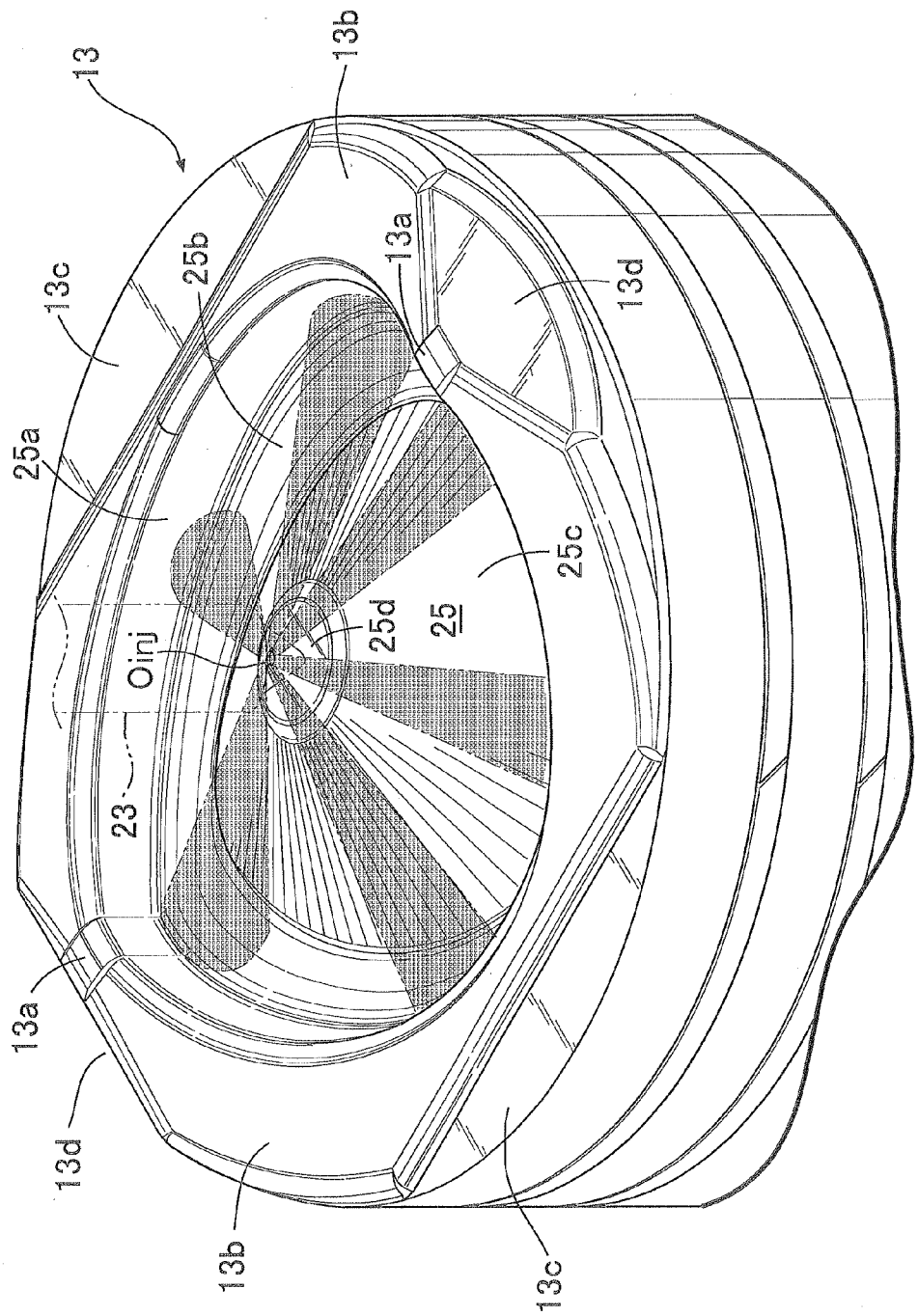
FIG. 4 is a perspective view of an upper part of a piston (first embodiment).

As is clear from FIG. 1 and FIG. 4, the top face of the piston 13 and the lower face of the cylinder head 16 facing it are not flat but are inclined in a pentroof shape with a triangular cross-section, and due to this shape it is possible to reduce the curvature of the intake port 19 and the exhaust port 20, guarantee a diameter for the intake valve holes 17 and 17 and the exhaust valve holes 18 and 18, and enhance the intake efficiency and the exhaust efficiency.

A cavity 25 with the piston central axis Lp as its center is recessed in the top face of the piston 13. Formed radially outside the cavity 25 are a pair of inclined faces 13b and 13b inclined downward to the intake side and the exhaust side from top portions 13a and 13a extending linearly parallel to the piston pin 14, a pair of flat faces 13c and 13c formed in the vicinity of the lower end of the inclined faces 13b and 13b so as to be perpendicular to the piston central axis Lp, and a pair of cutout portions 13d and 13d formed by cutting out opposite ends of the top portions 13a and 13a so as to be flat.

The fuel injector 23, which is disposed along the piston central axis Lp, injects fuel in six directions spaced at intervals of 60° in the circumferential direction with a fuel injection point Oinj, which is a virtual point on the piston central axis Lp, as the center. Among six fuel injection axes, two first fuel injection axes Li1 overlap the piston pin 14 when viewed in the piston central axis Lp direction, and the other four second fuel injection axes Li2 intersect the piston pin 14 direction at angles of 60°. Furthermore, when viewed in a direction perpendicular to the piston central axis Lp, the six first and second fuel injection axes Li1 and Li2 are inclined obliquely downward, the degree of downward inclination being small for the first fuel injection axes Lit and large for the second fuel injection axes Li2 (see FIG. 6 and FIG. 7).

Here, an injection point at which the fuel injector 23 actually injects fuel is slightly displaced radially outward from the piston central axis Lp, but the fuel injection point Oinj is defined as a point where the first and second fuel injection axes Li1 and Li2 intersect the piston central axis Lp.

Figure 5:
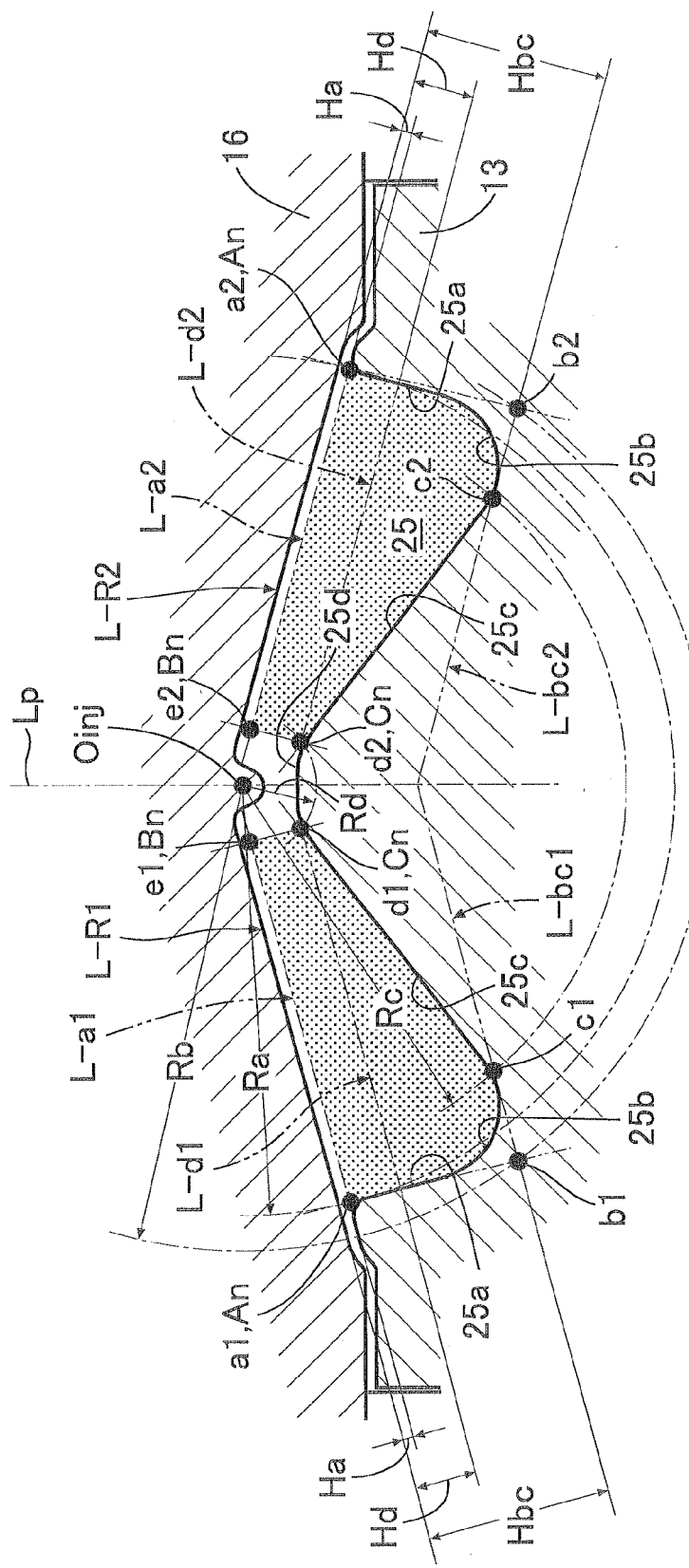
FIG. 5 is a cross-sectional view taken along line 5-5 in FIG. 3 (first embodiment).

The cross-sectional shape of a cavity 25 of the invention of the prior application is now explained in detail by reference to FIG. 5 to FIG. 7. The reason why the cross-sectional shape of the cavity 25 of the invention of the prior application is explained is that the cross-sectional shape of the cavity 25 of the invention of the present application is obtained by correcting the cross-sectional shape of the cavity 25 of the invention of the prior application. FIG. 5 is a cross-section in a direction perpendicular to the piston pin 14, FIG. 6 is a cross-section in a direction that intersects the piston pin 14 at 60° (cross-section containing second fuel injection axis Li2), and FIG. 7 is a cross-section in a direction along the piston pin 14 (cross-section containing first fuel injection axis Li1).

The invention of the prior application aims to make the shape of the cavity 25 as far as possible the same for any cross-section passing through the piston central axis Lp. The cross-sectional shape of the cavity 25 is divided into two, that is, left and right portions, sandwiching the piston central axis Lp; the two portions are substantially linearly connected in the cross-section in the piston pin 14 direction in FIG. 7, but are connected in a peak shape in accordance with the pentroof shape of the piston 13 in the cross-section in a direction perpendicular to the piston pin 14 in FIG. 5 and in the cross-section in a direction that intersects the piston pin 14 at 60° in FIG. 6. However, essential parts of the cross-sectional shape of the cavity 25, that is, the shaded portions in FIG. 5 to FIG. 7, are exactly the same.

Figure 6:
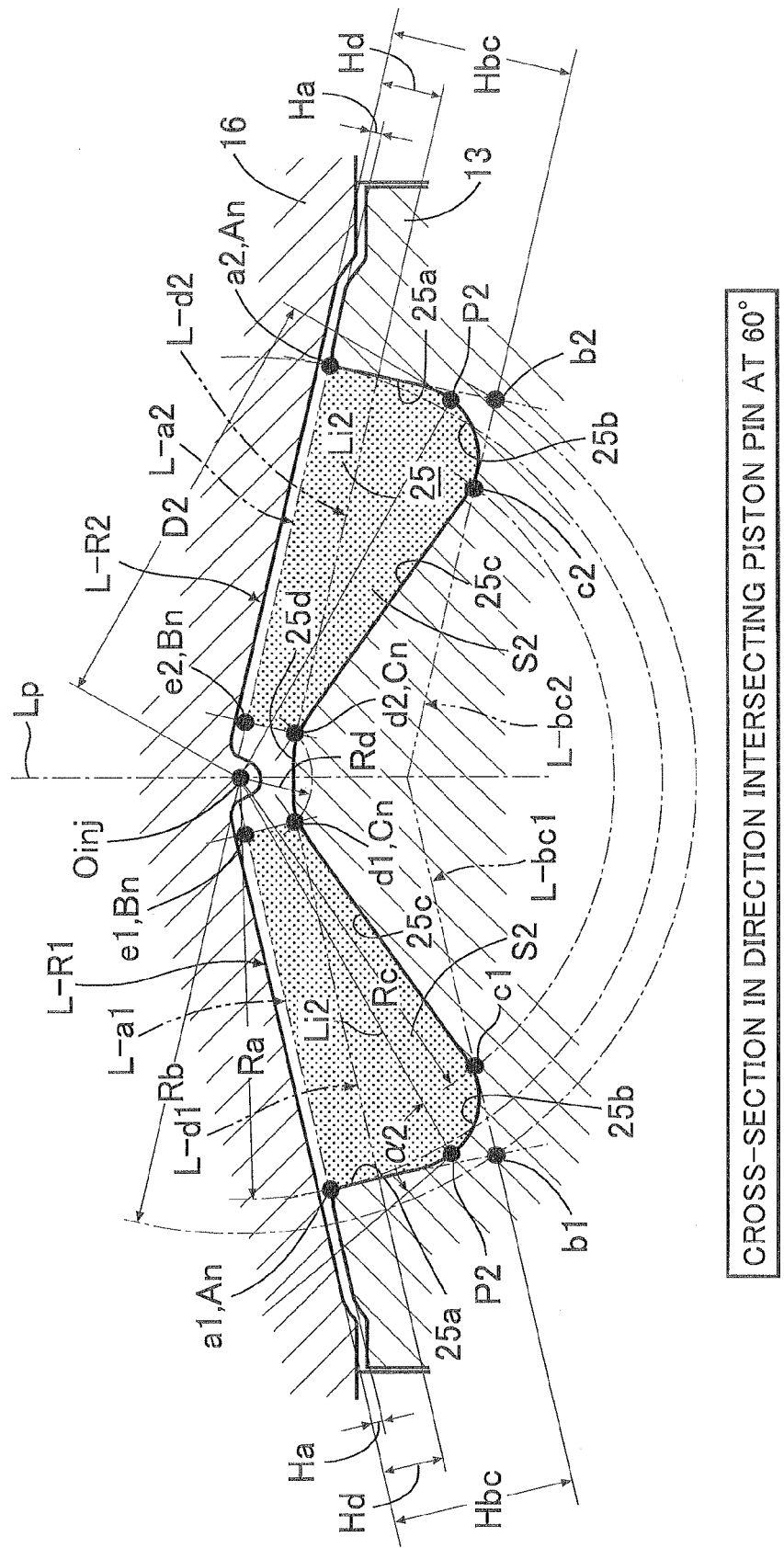
FIG. 6 is a cross-sectional view taken along line 6-6 in FIG. 3 (first embodiment).
Figure 7:
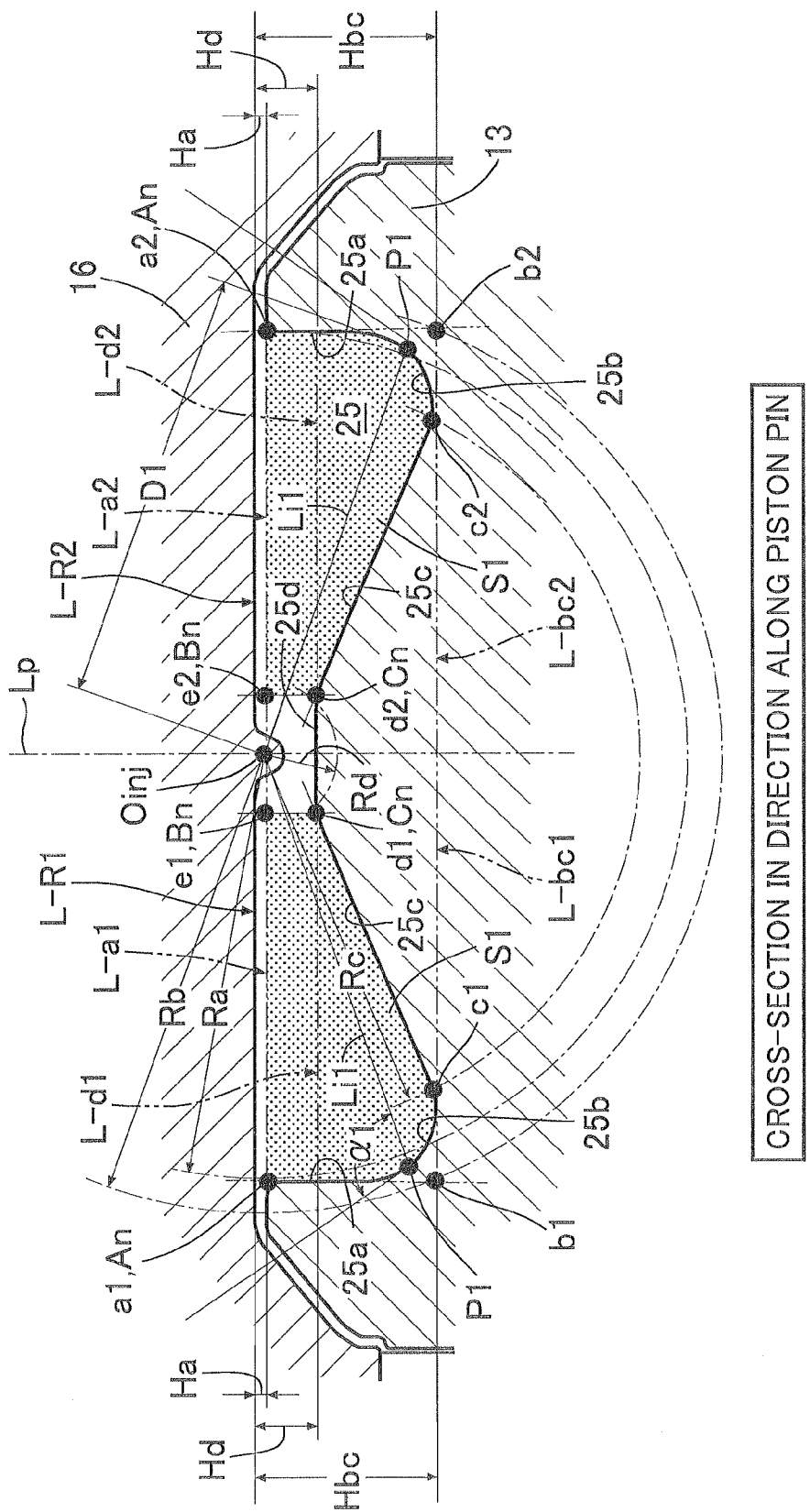
FIG. 7 is a cross-sectional view taken along line 7-7 in FIG. 3 (first embodiment).

As is clear from FIG. 5 to FIG. 7, the cavity 25 formed with the piston central axis Lp as the center is formed from a peripheral wall portion 25a extending linearly downward from the top face of the piston 13, a curved wall portion 25b curving in a concave shape from the lower end of the peripheral wall portion 25a toward the piston central axis Lp, a bottom wall portion 25c extending linearly obliquely upward from the radially inner end of the curved wall portion 25b toward the piston central axis Lp, and a top portion 25d connected to the radially inner end of the bottom wall portion 25c on the piston central axis Lp.

Lines extending parallel to and spaced only by a distance Ha downward from lines L-R1 and L-R2 denoting the lower face of the cylinder head 16 facing the cavity 25 are defined as piston top face baselines L-a1 and L-a2. Similarly, lines extending parallel to and spaced only by a distance Hbc downward from the lines L-R1 and L-R2 denoting the lower face of the cylinder head 16 are defined as cavity bottom face baselines L-bc1 and L-bc2, and lines extending parallel to and spaced only by a distance Hd downward from the lines L-R1 and L-R2 denoting the lower face of the cylinder head 16 are defined as cavity top portion baselines L-d1 and L-d2.

Intersection points of an arc having a radius Ra and the fuel injection point Oinj as the center with the piston top face baselines L-a1 and L-a2 are defined as a1 and a2. Similarly, intersection points of an arc having a radius Rb and the fuel injection point Oinj as the center with the cavity bottom face baselines L-bc1 and L-bc2 are defined as b1 and b2, intersection points of an arc having a radius Rc and the fuel injection point Oinj as the center with the cavity bottom face baselines L-bc1 and L-bc2 are defined as c1 and c2, and intersection points of an arc having a radius Rd and the fuel injection point Oinj as the center with the cavity top portion baselines L-d1 and L-d2 are defined as d1 and d2. Intersection points e1 and e2 are points at which perpendicular lines from the intersection points d1 and d2 to the piston top face baselines L-a1 and L-a2 intersect the piston top face baselines L-a1 and L-a2.

The peripheral wall portion 25a of the cavity 25 is on the straight line a1b1 or a2b2, the bottom wall portion 25c of the cavity 25 coincides with the straight line c1d1 or c2d2, and the curved wall portion 25b of the cavity 25 smoothly connects the straight line a1b1 or a2b2 and the straight line c1d1 or c2d2.

The shape of the cavity 25 is set so that the shaded cross-sectional shape defined by the intersection points a1, c1, d1, and e1 or the intersection points a2, c2, d2, and e2 is equal for any cross-section that passes through the piston central axis Lp.

The intersection points a1 and a2 correspond to a first specific point An of the present invention, the intersection points e1 and e2 correspond to a second specific point Bn of the present invention, and the intersection points d1 and d2 correspond to a third specific point Cn of the present invention.

With regard to the cross-sections that pass along the first and second fuel injection axes Li1 and Li2 shown in FIG. 6 and FIG. 7, the shaded portion in the cross-section (fuel injection cross-section S1) in the piston pin 14 direction shown in FIG. 7 and the shaded portion in the cross-section (fuel injection cross-section S2) in a direction that intersects the piston pin 14 at 60° shown in FIG. 6 have an identical shape.

In the cross-section in the piston pin 14 direction shown in FIG. 7, a point at which the first fuel injection axis Li1 intersects the cavity 25 is defined as a fuel collision point P1, and in the cross-section in a direction that intersects the piston pin 14 at 60° shown in FIG. 6 a point at which the second fuel injection axis Li2 intersects the cavity 25 is defined as a fuel collision point P2. The two fuel collision points P1 and P2 are present at the same positions of the shaded cross-sections having identical shapes. Therefore, the position of the fuel collision point P2 is lower than the position of the fuel collision point P1, and the second fuel injection axis Li2 extending from the fuel injection point Oinj injects fuel further downward than the first fuel injection axis Li1.

A distance D1 from the fuel injection point Oinj to the fuel collision point P1 is substantially the same as a distance D2 from the fuel injection point Oinj to the fuel collision point P2. Furthermore, a fuel collision angle α1 formed by a tangent to the cavity 25 at the fuel collision point P1 and the first fuel injection axis Li1 is substantially the same as a fuel collision angle α2 formed by a tangent to the cavity 25 at the fuel collision point P2 and the second fuel injection axis Li2.

As hereinbefore described, in accordance with the invention of the prior application, with regard to any cross-section that passes through the piston central axis Lp, the cross-sectional shapes of the cavity 25, excluding a very small part in the vicinity of the fuel injection point Oinj (region surrounded by intersection points e1, d1, d2, and e2), are formed so as to be identical. In particular, with regard to the two cross-sections containing the first and second fuel injection axes Li1 and Li2 (see FIG. 6 and FIG. 7), since the cross-sectional shapes of the cavity 25 are formed so as to be identical and, moreover, the distances D1 and D2 from the fuel injection point Oinj to the fuel collision points P1 and P2 in the two cross-sections are set so as to be substantially equal and the fuel collision angles α1 and α2 at the fuel collision points P1 and P2 are set so as to be substantially equal, the conditions in which air and fuel are mixed in each portion of the cavity 25 are made uniform in the circumferential direction, thus improving the combustion conditions for the gas mixture, increasing the engine output, and reducing harmful exhaust substances.

Furthermore, in the cross-sections in which the top face of the piston 13 is inclined as shown in FIG. 5 and FIG. 6, since the angle formed by the edge of the opening of the cavity 25 (portion at intersection point a2) is not made acute compared with a case in which the top face of the piston 13 is flat as shown in FIG. 7, it is possible to reduce the thermal load of this portion and improve the heat resistance.

Incidentally, in the invention of the prior application, the cross-sectional shapes of the cavity 25 in FIG. 5 to FIG. 7 are exactly the same in the shaded portions, but vary in the white regions surrounded by the intersection points e1, d1, d2, and e2 in the vicinity of the fuel injection point Oinj. The reason therefor is that two portions sandwiching the piston central axis Lp in the cross-sectional shape of the cavity 25 are connected in a substantially straight line in the cross-section in the piston pin 14 direction in FIG. 7, but in the cross-section in a direction perpendicular to the piston pin 14 in FIG. 5 and in the cross-section in a direction intersecting the piston pin 14 at 60° in FIG. 6, they are connected in a peak shape in accordance with the pentroof shape of the piston 13. The area of the white region surrounded by the intersection points e1, d1, d2, and e2 is the largest in the cross-section in the piston pin 14 direction in FIG. 7, decreases in the cross-section in the direction intersecting the piston pin 14 at 60° in FIG. 6, and further decreases in the cross-section in the direction perpendicular to the piston pin 14 in FIG. 5.

An embodiment of the present invention makes the conditions in which air and fuel are mixed more uniform in cross-sections in all directions of the cavity 25 by correcting, with as a reference the cross-sectional shape (see FIG. 7) of the cavity 25 in the piston pin 14 direction in which the area of the white region surrounded by the intersection points e1, d1, d2, and e2 is a maximum, the cross-sectional shape in other directions so that it enlarges (that is, increasing in directions in which the depth of the cavity 25 increases), thus compensating for the difference in area between the white regions surrounded by the intersection points e1, d1, d2, and e2.

Figure 8:
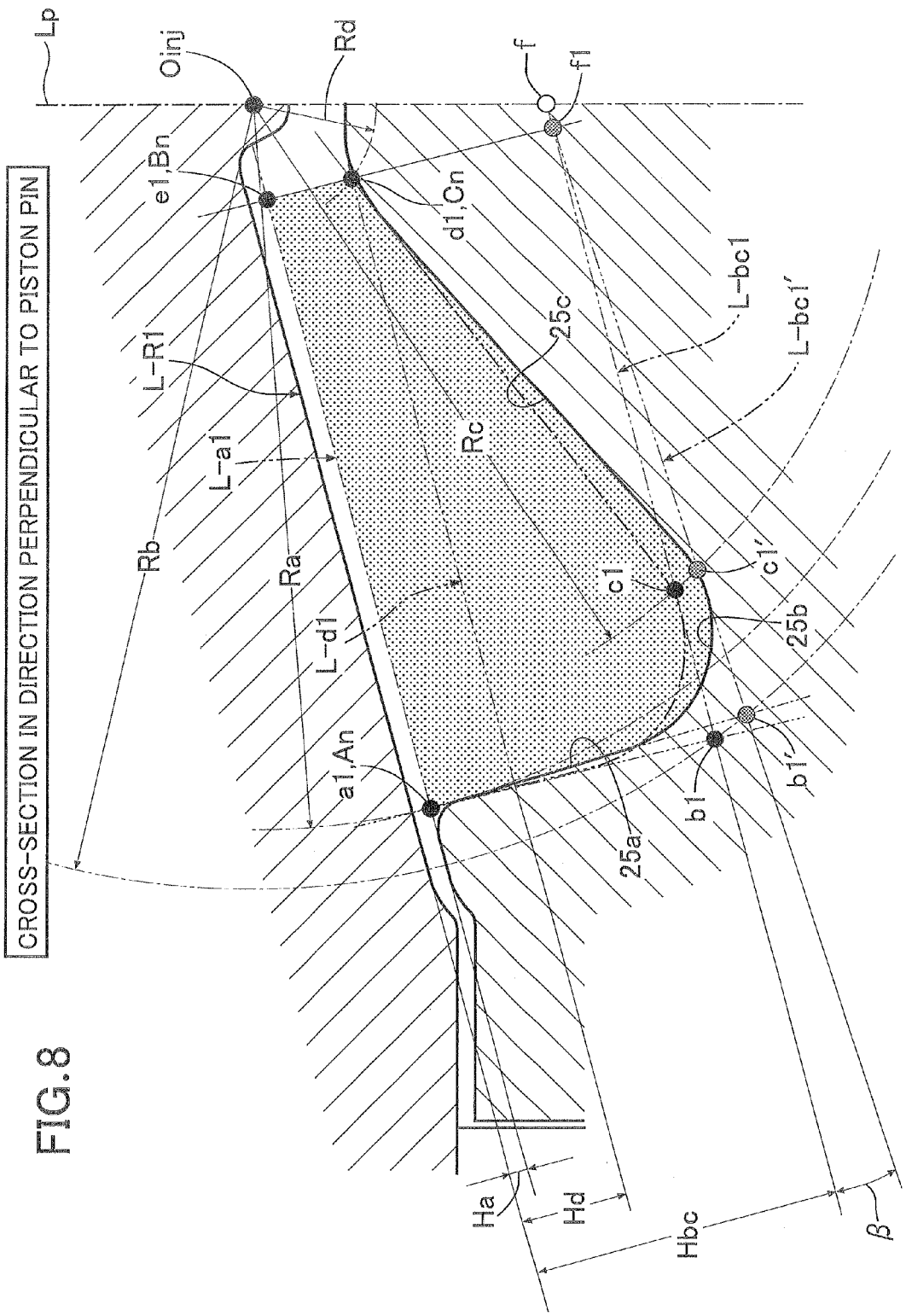
FIG. 8 is a view, corresponding to FIG. 5 above, showing a cross-sectional shape of a cavity after correction (first embodiment).

FIG. 8 explains a method for correcting the cross-sectional shape of the cavity 25 in the direction perpendicular to the piston pin 14 in FIG. 5; the shape denoted by a broken line corresponds to the invention of the prior application, and the shape denoted by a solid line corresponds to the present embodiment.

Correction of the cross-sectional shape of the cavity 25 in accordance with the present embodiment is carried out by moving the positions of the intersection point b1 and the intersection point c1 downward to an intersection point b1' and an intersection point c1' respectively so as to increase the area of the shaded portion.

First, an intersection point between the cavity bottom face baseline L-bc1 and a downward extension of the straight line e1d1 is defined as f1. Subsequently, the cavity bottom face baseline L-bc1, which passes through the intersection point f1, is rotated downward only by a predetermined angle β with the intersection point f1 as the center, and a new cavity bottom face baseline L-bc1' is thus set. Subsequently, an intersection point between the arc having a radius Rb with the fuel injection point Oinj as the center and the new cavity bottom face baseline L-bc1' is defined as the above b1', and an intersection point between the arc having a radius Rc with the fuel injection point Oinj as the center and the new cavity bottom face baseline L-bc1' is defined as the above c1'.

In the cross-sectional shape of the cavity 25 after correction, the peripheral wall portion 25a of the cavity 25 is on the straight line a1b1', the bottom wall portion 25c of the cavity 25 coincides with the straight line c1'd1, and the curved wall portion 25b of the cavity 25 smoothly connects the straight line a1b1' and the straight line c1'd1.

Here, an intersection point between the cavity bottom face baseline L-bc1 and the piston central axis Lp is defined as f, and by rotating the cavity bottom face baseline L-bc1 downward by the predetermined angle β with the intersection point f as the center, the new cavity bottom face baseline L-bc1' may be determined.

Although, of the path AnCn on an inner wall face of the cavity 25, a section from the lowest part of the path AnCn to the third specific point Cn is close to the second fuel injection axis Li2, by varying the shape of the section in this way it is possible to suppress attachment of fuel to the inner wall face of the cavity 25, thus preventing degradation of combustion.

In this embodiment, net mean effective pressure, NMEP, is improved by on the order of 2% relative to the invention of the prior application in a state in which soot is not generated.

Figure 9:
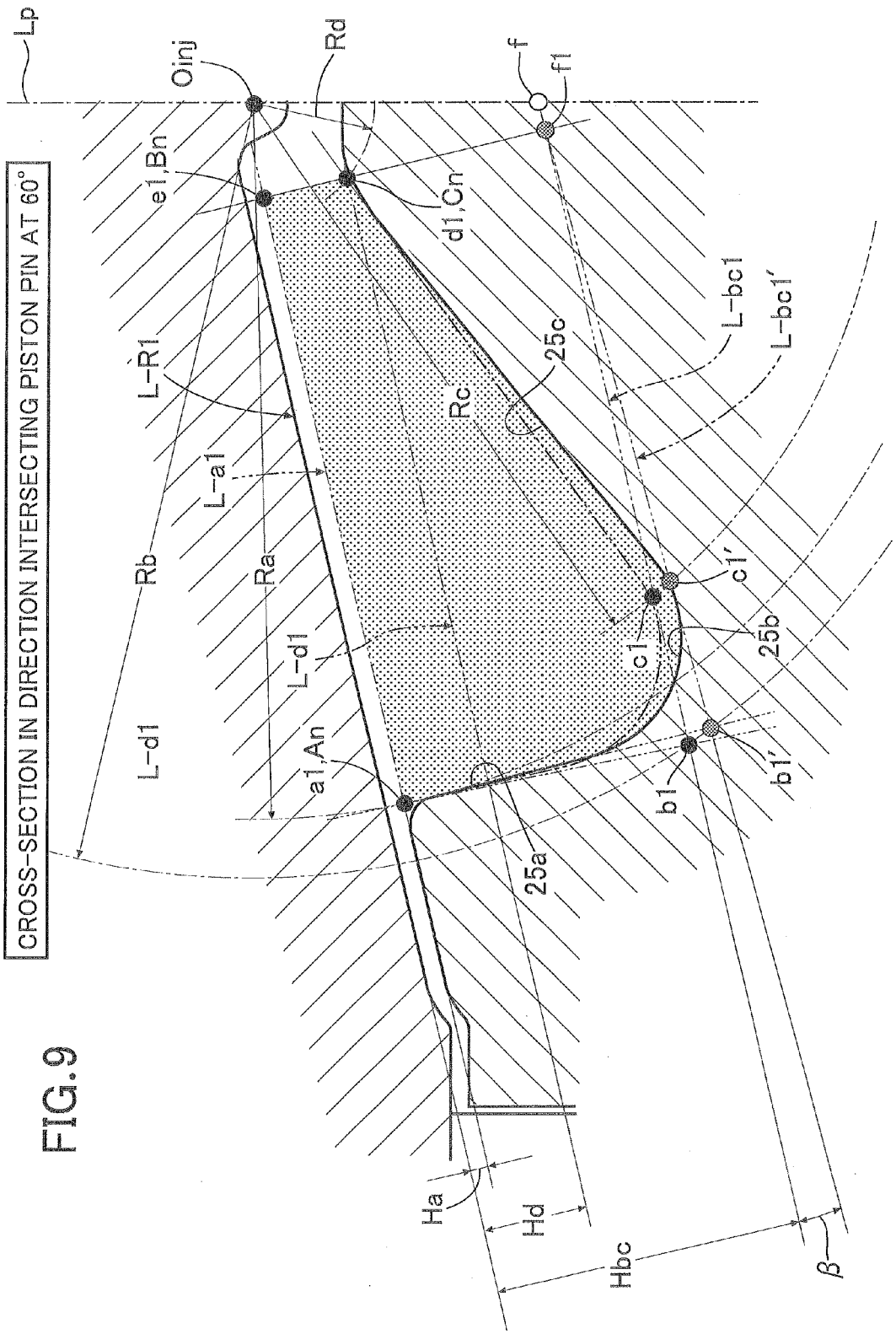
FIG. 9 is a view, corresponding to FIG. 6 above, showing a cross-sectional shape of a cavity after correction (first embodiment).

FIG. 9 explains a method for correcting the cross-sectional shape of the cavity 25 in a direction that intersects the piston pin 14 at 60° in FIG. 6; the shape denoted by a broken line corresponds to the invention of the prior application, and the shape denoted by a solid line corresponds to the present embodiment.

Since, compared with the difference in white area surrounded by the intersection points e1, d1, d2, and e2 between FIG. 7 (piston pin 14 direction) and FIG. 5 (direction perpendicular to the piston pin 14), the difference in this area between FIG. 7 (piston pin 14 direction) and FIG. 6 (direction intersecting the piston pin 14 at 60°) is small, the amount of enlargement in the cross-sectional shape of the cavity 25 in FIG. 9 (direction intersecting the piston pin 14 at 60°) is smaller than the amount of enlargement in the cross-sectional shape of the cavity 25 in FIG. 8 (direction perpendicular to the piston pin 14).

Correction of the cross-sectional shape of the cavity 25 on one side of the piston central axis Lp is explained above, and correction of the cross-sectional shape of the cavity 25 on the other side of the piston central axis Lp is carried out in exactly the same manner.

As hereinbefore described, in accordance with this embodiment, the problem of the invention of the prior application, that is, the difference in cross-sectional shape of the cavity 25 in the region surrounded by the intersection points e1, d1, d2, and e2 in the vicinity of the fuel injection point Oinj, can be compensated for, and it is therefore possible to make the conditions in which air and fuel are mixed in each portion of the cavity 25 more uniform in the circumferential direction, improve the combustion conditions for the gas mixture, further increase the engine output, and further reduce harmful exhaust materials.

Figure 10:
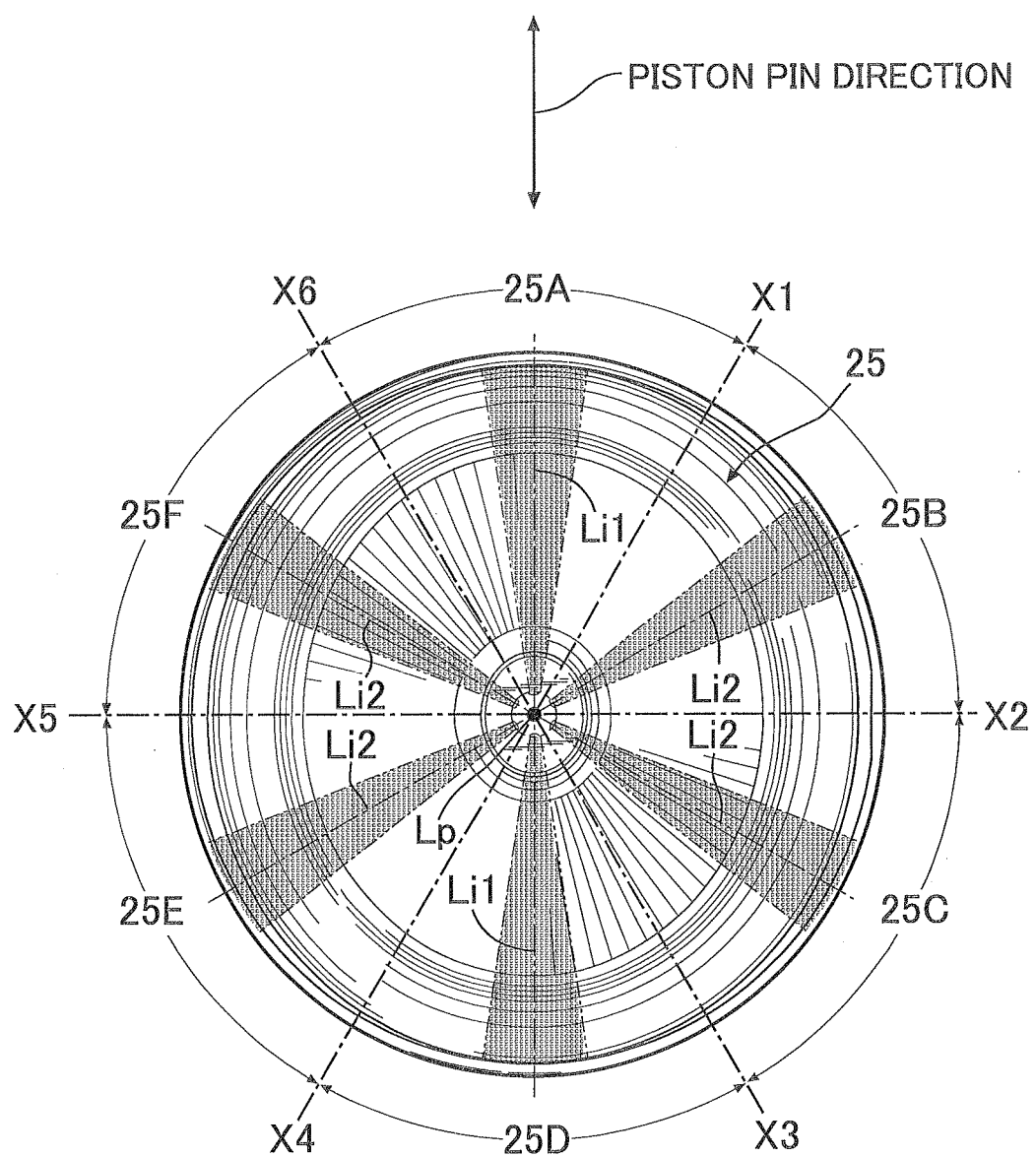
FIG. 10 is a view for explaining virtual cavity sections (first embodiment).

FIG. 10 is a view for explaining, from another viewpoint, correction of the cross-sectional shape of the cavity 25 in accordance with the present embodiment.

In this figure, six half planes X1 to X6 extend radially from the piston central axis Lp passing through the center of the cavity 25. Angles (included angles) formed by two adjacent half planes XI to X6 are all 60°, and six bisectors that bisect the space between two adjacent half planes XI to X6 overlap the first and second fuel injection axes Li1 and Li2 when viewed in the piston central axis Lp direction. The cavity 25 is divided into six virtual cavity sections 25A to 25F by the six half planes XI to X6 and, in accordance with this embodiment, due to the above-mentioned correction of the cross-sectional shape of the cavity 25, it is theoretically possible to set the volumes of the six cavity sections 25A to 25F so as to be identical.

However, it is not necessary to set the volumes of the six cavity sections 25A to 25F so as to be completely identical; even if they are only set so as to be substantially identical it is possible to make the conditions in which fuel is mixed more uniform in the circumferential direction compared with the invention of Patent Document 1 or the invention of the prior application. Specifically, by making the variation in volume of the six cavity sections 25A to 25F, that is, the difference in volume between the maximum volume cavity section and the minimum volume cavity section, small compared with the invention of Patent Document 1 or the invention of the prior application, it is possible to make the conditions in which fuel is mixed in the circumferential direction more uniform.

FIG. 11 shows the percentage change in volume of the cavity section when the direction of the cavity section (i.e. direction of the bisector of the included angle of the cavity section) is moved in a range of 60° to both left and right of the piston central axis Lp with the piston pin 14 direction as a reference (0°). The broken line corresponds to the conventional example (the invention of Patent Document 1), and the solid line corresponds to the present embodiment.

In all cases, the point when the direction of the bisector of the included angle of the cavity section intersects the piston pin 14 direction at 60° (see cavity sections 25B, 25C, 25E, and 25F in FIG. 10) is taken as a reference, and the percentage change at that point is defined as 0%. In the conventional example shown by the broken line, when the direction of the bisector of the included angle of the cavity section coincides with the piston pin 14 direction (see cavity sections 25A and 25D in FIG. 10), the percentage change is a maximum of on the order of 7%, but in the embodiment shown by the solid line, although the percentage change is a maximum at the same position, the value is greatly reduced and is suppressed to only 0.5%.

Therefore, one definition of the invention of the present application can be that "the variation in volume of the cavity sections 25A to 25F is smaller than the variation in volume of the cavity sections 25A to 25F of the conventional example (the invention of Patent Document 1) in which the depth of the cavity is made uniform in the circumferential direction".

An embodiment of the present invention is explained above, but the present invention may be modified in a variety of ways as long as the modifications do not depart from the sprit and scope thereof.

For example, in the embodiment, the number of virtual cavity sections 25A to 25F is set at six (N=6), but the number of cavity sections 25A to 25F may be two or more (N is a natural number of 2 or more).

In this case, the number of cavity sections 25A to 25F and the number of fuel-injection axes do not necessarily coincide with each other, but by making them coincide with each other one fuel-injection axis corresponds to one cavity section 25A to 25F, and the conditions in which fuel is mixed can be made more uniform in the circumferential direction. Here, making the bisectors of the included angles of the cavity sections 25A to 25F coincide with fuel-injection axes allows the fuel-injection axis to be positioned at the center of each of the cavity sections 25A to 25F, thereby making the conditions in which fuel is mixed more uniform.

Furthermore, in the embodiment, the volume of the virtual cavity sections 25A to 25F does not include the volume of a portion sandwiched between the lower face of the cylinder head 16 and the top face of the piston 13 when at top dead center, and is defined as the volume up to the opening edge of the cavity 25 (that is, the volume below the piston top face baselines L-a1 and L-a2), but even if a volume including this portion is defined as the volume of the virtual cavity sections 25A to 25F, the same operational effects can be exhibited.

Moreover, in the embodiment, an explanation is given for a diesel engine, but the invention of the present application is not limited to a diesel engine and may be applied to any type of engine in which fuel is directly injected into a combustion chamber.

The invention claimed is:

1. A direct fuel-injection engine comprising a piston having a top face with a height in a piston central axis direction that varies in the circumferential direction, a cavity recessed in a central part of the top face of the piston, and a fuel injector for injecting fuel into the cavity,
    wherein the shape of an inner wall face of the cavity is set so that, with N as A natural number of 2 or more, when the cavity is divided into N virtual cavity sections by the inner wall face of the cavity and N half planes extending radially from the piston central axis and having equal included angles, the volumes of the virtual cavity sections are substantially equal.

2. The direct fuel-injection engine according to claim 1, wherein
    the fuel injector comprises a plurality of fuel injection axes spaced in the circumferential direction,
    a cross-section of the cavity passing through an nth fuel injection axis is defined as a fuel injection cross-section,
    an intersection point of the fuel injection cross-section with the opening Peripheral edge of the cavity is defined as a first specific point,
    a second specific point is present on a line that passes through the first Specific point and is parallel to a lower face of a cylinder head in the fuel injection cross-section,
    a third specific point is present on a bottom wall portion of the cavity in the fuel injection cross-section,
    the second specific point is at a position closer to the piston central axisthan the first specific point,
    the third specific point is at a position closer to the piston central axisthan a position of the maximum outer diameter of the bottom wall portion of the cavity,
    a cross-sectional shape surrounded by a path connecting the first and Second specific points by a line along the lower face of the cylinder head in the fuel injection cross-section, a path connecting the first and third specific points along a wall face of the cavity in the fuel injection cross-section and a path connecting the second and third specific points by the shortest straight line, the cross-sectional shape being substantially equal for each fuel injection cross-section, is defined as a reference cross-sectional shape, and
    the volume of each virtual cavity section is made substantially equal by varying the shape of the inner wall face of the cavity so that the reference cross-sectional shape enlarges for the fuel injection cross-section passing through a fuel injection axis that is present in a direction where the height, in the piston central axis direction, of the top face of the piston is low.

3. The direct fuel-injection engine according to claim 2 wherein, of the path connecting the first and third specific points, the shape of a section from the lowest part of the path connecting the first and third specific points to the third specific point comprises a diagonal section.

4. The direct fuel-injection engine according to claim 2, wherein the number N of the virtual cavity sections is equal to the number of the fuel injection axes.

5. The direct fuel-injection engine according to claim 4, wherein the bisector of the included angle coincides with the fuel injection axis when viewed in the piston central axis direction.

6. The direct fuel-injection engine according to claim 1, wherein the volume of the virtual cavity sections includes the volume of a portion sandwiched by the top face of the piston at top dead center and a lower face of a cylinder head.

7. The direct fuel-injection engine according to one of claims 1 to 5, wherein the shape of the top face of the piston is a pentroof shape having two inclined faces that are inclined with a ridgeline parallel to the axis of a piston pin interposed there between.

* * * * *